United States Patent [19]
Coronell et al.

[11] Patent Number: 5,637,285
[45] Date of Patent: Jun. 10, 1997

[54] PROCESS FOR NITROGEN TRIFLUORIDE SYNTHESIS

[75] Inventors: Daniel G. Coronell, Allentown; Thomas H.-L. Hsiung, Emmaus; Howard P. Withers, Jr., Breinigsville; Andrew J. Woytek, Allentown, all of Pa.

[73] Assignee: Air Products and Chemicals, Inc., Allentown, Pa.

[21] Appl. No.: 593,779

[22] Filed: Jan. 30, 1996

[51] Int. Cl.$^6$ .................................................. C01B 21/06
[52] U.S. Cl. .......................................................... 423/406
[58] Field of Search .............................................. 423/406

[56] References Cited

U.S. PATENT DOCUMENTS

| 4,091,081 | 5/1978 | Woytek et al. | 423/406 |
| 4,543,242 | 9/1985 | Aramaki et al. | 423/406 |

FOREIGN PATENT DOCUMENTS

| 2255513 | 10/1990 | Japan | C01B 00/21 |
| 2255511 | 10/1990 | Japan | C01B 00/21 |
| 225512 | 10/1990 | Japan | C02B 00/21 |
| 170307 | 7/1991 | Japan | 423/406 |
| 3232710 | 10/1991 | Japan . | |

OTHER PUBLICATIONS

Bakker, et al., "How to Disperse Gases in Liquids", Chemical Engineering, Dec. 1994, pp. 98–104.

"Chemical Reactor Development", D. Thoenes, Kluwer Academeic Publishers,Dordrecht, The Netherlands (1994) pp. 98–114.

Jones, A.G., "Liquid Circulation in a Draft–Tube Bubble Column", Chemical Engineering Science, vol. 40, No. 3 p. 449, 1985.

Anderson, et al., USAF Propellant Handbooks, vol. 111, Part A, Nitrogen Trifluoride, Systems Design Criteria, Jan. 1978.

John H. Perry's *Chemical Engineers' Handbook Fourth Edition* (1963), McGraw–Hill Book Co., pp. 19–5 through 19–16.

*Primary Examiner*—Wayne Langel
*Attorney, Agent, or Firm*—Geoffrey L. Chase

[57] ABSTRACT

The present invention is directed to a method for the synthesis of nitrogen trifluoride from elemental fluorine gas and a source of ammonia in a gas-liquid phase reaction comprising;

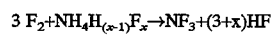

$$3\,F_2 + NH_4H_{(x-1)}F_x \rightarrow NF_3 + (3+x)HF$$

wherein the melt ratio HF/NH$_3$ represented by x in the above formula is at least 2.55 and the reaction liquid is agitated or mixed with a mixing apparatus with power input to the mixing apparatus at a high level equivalent to or greater than 1000 watts per cubic meter. This improved synthesis method allows for enhanced nitrogen trifluoride yields of 70% or greater.

24 Claims, 6 Drawing Sheets

1

PROCESS FOR NITROGEN TRIFLUORIDE SYNTHESIS

TECHNICAL FIELD OF THE INVENTION

The present invention is directed to the field of nitrogen trifluoride synthesis from elemental fluorine and ammonium acid fluoride. More specifically, the present invention is directed to the use of a combination of higher HF:NH$_3$ melt ratios and greater synthesis reactor agitation to dramatically increase the yield of nitrogen trifluoride.

BACKGROUND OF THE INVENTION

There is currently a large and growing requirement of NF$_3$ for use in semiconductor manufacturing. Methods of producing NF$_3$, however, are not nearly as efficient as theoretically possible which is shown by current syntheses' poor efficiency of utilizing expensive F$_2$. The two principle methods, electrochemical fluorination (ECF) and direct fluorination (DF), have yields less than 50% of theory and most typically in the range of 30–45%. These yields are based on the equivalents of F$_2$ used in the process. In the direct fluorination of NH$_3$ or NH$_4^+$ salts to produce NF$_3$, there are competing reactions as follows:

$$3F_2 + NH_3 \rightarrow NF_3 + 3HF \quad (1)$$

$$3F_2 + 2NH_3 \rightarrow N_2 + 6HF \quad (2)$$

$$4F_2 + 2NH_3 \rightarrow N_2F_2 + 6HF \quad (3)$$

The most favored reaction according to thermodynamic calculations is (2), which produces only undesirable N$_2$ and HF. The prior art has attempted to enhance reaction (1) to produce NF$_3$ and minimize the extent of reactions (2) and (3). Previous attempts to produce NF$_3$ by the direct fluorination of NH$_3$ in liquid ammonium acid fluoride resulted in yields of 30 to 63%.

Currently the most efficient process for producing NF$_3$ is U.S. Pat. No. 4,091,081. It involves the direct fluorination of ammonium ions by F$_2$ whereby gaseous F$_2$ is contacted with liquid (molten) ammonium acid fluoride (AAF) while gaseous NH$_3$ is separately contacted with the liquid AAF to generate ammonium ions. This process typically gives NF$_3$ yields of 40–50%. It is operated to maintain a molar ratio of by-product HF to ammonia of 2.0 to 2.5 (melt ratio) in the reaction liquid and at temperatures above the melting point of ammonium bifluoride, NH$_4$HF$_2$, which is 127° C. The contacting of F$_2$ with AAF is done using a specially designed sparger having a plurality of small holes. The most significant shortcoming of this process is the low selectivity and yield of NF$_3$.

U.S. Pat. No. 4,543,242 discloses a synthesis of NF$_3$ using gaseous fluorine and solid (NH$_4$)$_3$AlF$_6$. The yield of NF$_3$ was in the range of 65–78% based upon fluorine.

Japanese Patent Kokai 03-232710 discloses the synthesis of NF$_3$ from a metal fluoride, an inorganic ammonium salt and elemental fluorine.

Gas phase reactions of ammonia and fluorine are described in Japanese Patent Kokais 02-255511; 02-255512 and 02-255513. In the former Kokai, an NF$_3$ yield of 43.7% is reported.

The prior art has failed to produce nitrogen trifluoride in yields in the range achieved by the present invention. With the increased demand for nitrogen trifluoride from the electronics industry, a need has arisen to utilize larger nitrogen trifluoride production plants. At the higher energy and capital costs of such larger production plants, it is increasingly important to achieve the highest yields possible from the reaction synthesizing nitrogen trifluoride. The present invention achieves these high yields as will be set forth in greater detail below.

BRIEF SUMMARY OF THE INVENTION

The present invention is a method for synthesis of NF$_3$ by the reaction of a fluorine reactant and an ammonium complex reactant selected from the group consisting of NH$_4$H$_{(x-1)}$F$_x$, (NH$_4$)$_y$MF$_z$·nHF and mixtures thereof where x is equal to or greater than 2.55, y is 1–4, z is 2–8, n is sufficient at reaction conditions to maintain said ammonium complex reactant as substantially as a liquid and M is selected from the group consisting of elements from Group IA through VA, Group IB through VIIB and Group VIII of the Periodic Table of the Elements and mixtures thereof, and the reactants are mixed at a rate to maintain a percent NF$_3$ yield of at least 65 percent.

Preferably, the reactants are mixed at a rate to maintain a percent NF$_3$ yield of at least 80 percent.

More preferably, the reactants are mixed at a rate to maintain a percent NF$_3$ yield of at least 90 percent.

Preferably, the reaction is conducted in a stirred reactor.

Preferably, the reaction is conducted in a bubble column reactor.

Preferably, the reaction is performed in a continuous manner with fluorine and an ammonia source continuously added to said reaction.

Preferably, ammonia source is selected from the group consisting of NH$_3$, NH$_4$F, NH$_4$HF$_2$, NH$_4$Cl, NH$_4$Br, NH$_4$I, NH$_4$NO$_3$, (NH$_4$)$_2$SO$_4$ and (NH$_4$)$_2$CO$_3$ and mixtures thereof.

Preferably, x is greater than or equal to 2.65.

More preferably, x is greater than or equal to 2.85.

Preferably, the temperature of said reaction is in the range of 93° C. to 204° C.

More preferably, the temperature of said reaction is in the range of 121° C. to 160° C.

Preferably, the pressure of the reaction is maintained in the range of 0 to 400 psig.

Preferably, the pressure of the reaction is maintained in the range of 0 to 50 psig.

The present invention in an alternative embodiment is a method for synthesis of NF$_3$ by the reaction of a fluorine reactant and an NH$_4$H$_{(x-1)}$F$_x$ reactant, where x is equal to or greater than 2.55, and the reactants are mixed using a mixing means at a mixing level achieved by input of power to said mixing means of greater than or equal to 1000 watts per cubic meter of reactor volume based upon mixing means comprising a flat blade turbine.

Preferably, the power is greater than or equal to 5000 watts per cubic meter.

More preferably, the power is greater than or equal to 35,000 watts per cubic meter.

The present invention is further a method for synthesis of NF$_3$ by the reaction of a fluorine reactant and an ammonium complex reactant selected from the group consisting of NH$_4$H$_{(x-1)}$F$_x$,(NH$_4$)$_y$MF$_z$·nHF and mixtures thereof where x is equal to or greater than 2.55, y is 1–4, z is 2–8, n is sufficient at reaction conditions to maintain said ammonium complex reactant substantially as a liquid and M is selected from the group consisting of elements from Group IA through VA, Group IB through VIIB and Group VIII of the Periodic Table of the Elements and mixtures thereof, and the reactants are mixed at a rate to maintain a percent $NF_3$ selectivity of greater than or equal to 50 percent.

Preferably, the percent $NF_3$ selectivity is greater than or equal to 60 percent.

More preferably, the percent $NF_3$ selectivity is greater than or equal to 80 percent.

DETAILED DESCRIPTION OF THE INVENTION

Figure 1:
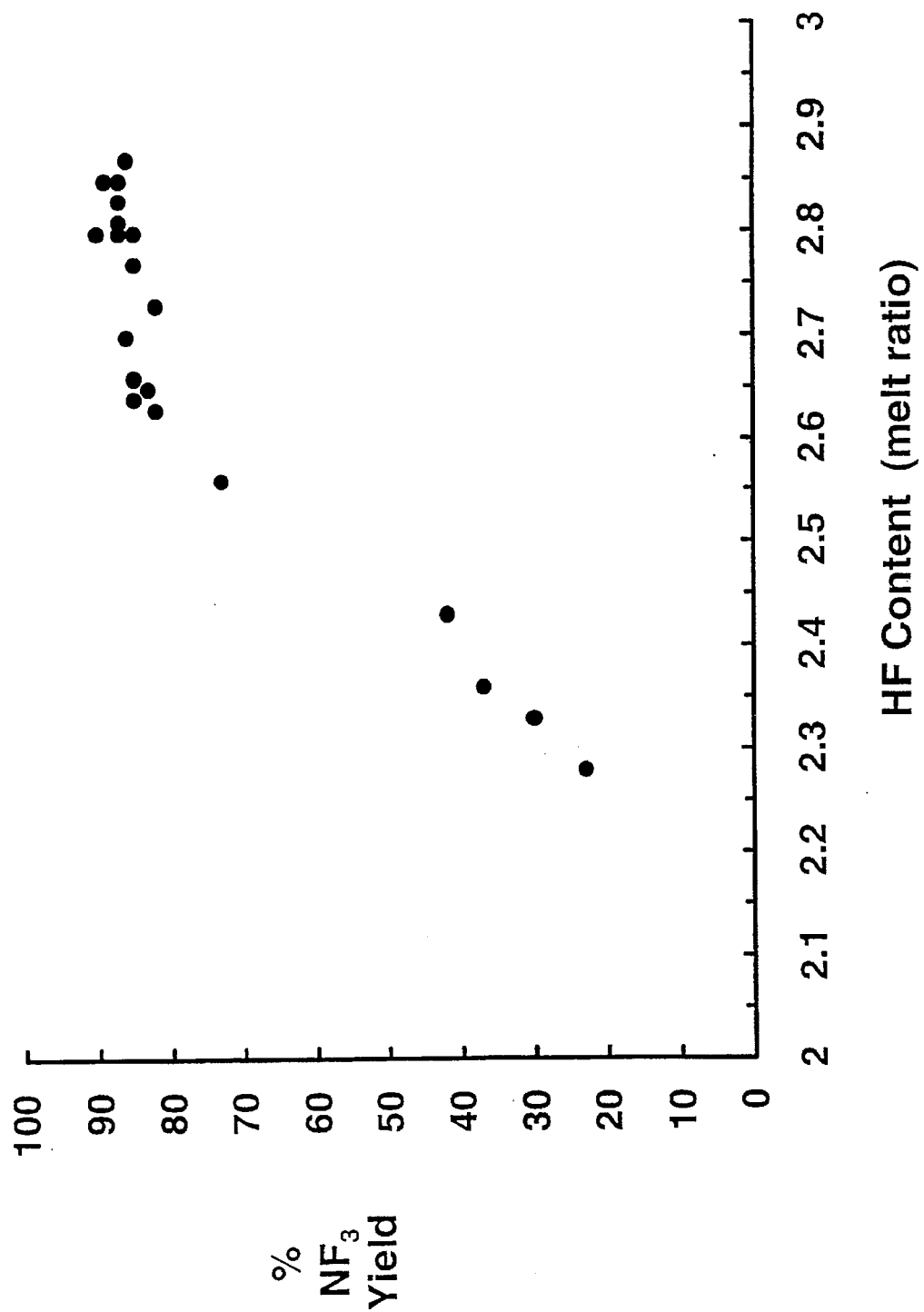
FIG. 1 is a graph of % $NF_3$ Yield versus HF content ($HF/NH_3$ melt ratio) for a preferred embodiment of the present invention for nitrogen trifluoride synthesis wherein the melt ratio was varied from 2.28 to 2.85 per Example 1, below. Enhanced $NF_3$ yields were obtained at high melt ratios. The power was 35,000 watts/cu. meter in a stirred reactor.

The method of the present invention involves contacting gaseous $F_2$ as the fluorine reactant with a vigorously mixed ammonium complex reactant comprising ammonium acid fluoride liquid ($NH_4H_{(x-1)}F_x$) or $(NH_4)_yMF_z \cdot nHF$ or mixtures thereof in which the ratio of equivalents of HF to $NH_3$ in this ammonium acid fluoride complex reactant is greater than or equal to approximately 2.55 (i.e., $x \geq \sim 2.55$), n is sufficient to maintain the ammonium complex reactant at reaction conditions substantially as a liquid (at least 50% by volume), M is selected from the group consisting of elements from Group IA through VA, Group IB through VIIB and Group VIII of the Periodic Table of the Elements, namely: lithium, sodium, potassium, rubidium, cesium, beryllium, magnesium, calcium, strontium, barium, boron, aluminum, gallium, indium, thallium, silicon, germanium, tin, lead, nitrogen, phosphorus, arsenic, antimony, bismuth, copper, silver, gold, zinc, cadmium, mercury, scandium, yttrium, lanthanum, actinium, titanium, zirconium, hafnium, cerium, vanadium, niobium, tantalum, praseodymium, chromium, molybdenum, tungsten, manganese, rhenium, iron, ruthenium, osmium, cobalt, rhodium, iridium, nickel, palladium and platinum, y is 1–4, z is 2–8. In other words, "x" in the formula is equal to the ratio of HF to $NH_3$ in the reaction liquid and is also called the melt ratio. Preferably, the melt ratio is greater than or equal to approximately 2.65, most preferably, greater than or equal to approximately 2.85. Operation at these high melt ratios results in unexpectedly high $NF_3$ yields of 65%, preferably 80% and up to 90%, when using an elevated mixing rate as in a stirred reactor. Also at melt ratios above or equal to approximately 2.55, lower reaction temperatures can be used because the melting point of the ammonium complex reactant liquid decreases with higher melt ratio. Lower reaction temperatures favor reaction (1) over reaction (2).

For the purpose of the present invention, the % yield of $NF_3$ shall be on a molar basis determined as follows: [3(moles of $NF_3$ produced)/moles of $F_2$ fed]100. The % selectivity to $NF_3$ shall be on a molar basis determined as follows: [3(moles of $NF_3$ produced)/moles of $F_2$ reacted]100. The % $F_2$ conversion shall be on a molar basis determined as follows: [moles of $F_2$ reacted/moles of $F_2$ fed]100. The melt ratio shall be the molar ratio of HF to $NH_3$ in the reaction liquid.

In practicing the method of the present invention in a preferred embodiment, a stirred reactor vessel contains ammonium bifluoride and HF in such a ratio to give ammonium poly(hydrogen fluoride) complexes, $NH_4H_{(x-1)}F_x$, where $x \geq \sim 2.55$. While rapidly stirring this liquid, gaseous $F_2$ is passed into the liquid through a sparger. The $F_2$ reacts with the ammonium poly(hydrogen fluoride) complex to form $NF_3$ very selectively along with by-product HF and small amounts of $N_2$. Separately, gaseous $NH_3$ is passed into the liquid at the same time through a sparger to react with the HF to generate more ammonium poly(hydrogen fluoride) for reaction with $F_2$. The rate of $NH_3$ addition is maintained at a level such that the melt ratio remains $\geq \sim 2.55$. The high NF3 yields are observed with or without gaseous $NH_3$ cofeed, however, a continuous process is desirable and thus $NH_3$ cofeed is advantageous. The reactions are outlined as follows, where $x \geq \sim 2.55$:

$$3F_2 + NH_4H_{(x-1)}F_x \rightarrow NF_3 + (3+x)HF \quad (4)$$

$$NH_3 + xHF \rightarrow NH_4H_{(x-1)}F_x \quad (5)$$

$$3F_2 + 2NH_4H_{(x-1)}F_x \rightarrow N_2 + (6+2x)HF \quad (6)$$

Any source of ammonia or ammonium ion could be used such that its combination with the proper amount of HF generates substantially a liquid within the operating range. For example, sources such as ammonia or ammonium salts including $NH_3$, $NH_4F$, $NH_4HF_2$, $NH_4Cl$, $NH_4Br$, $NH_4I$, $NH_4NO_3$, $(NH_4)_2SO_4$, and $(NH_4)_2CO_3$ could be used. Also complex ammonium fluorometallate poly(hydrogen fluorides) generated by the reaction of ammonium fluorometallates with the proper amount of HF to give substantially a liquid could be used. This general class of ammonium complexes can be described by $(NH_4)_yMF_z \cdot nHF$, where M is a metal selected from the group consisting of elements from Group IA through VA, Group IB through VIIB and Group VIII of the Periodic Table of the Elements or mixtures thereof; y=1–4; z=2–8 and n is sufficient to maintain the ammonium complex as a liquid in the existing reaction conditions. This class of compounds could also be generated by the reaction between ammonium fluoride, HF and metal fluorides or the reaction between ammonium poly(hydrogen fluoride) and metal fluorides.

The present inventors have found unexpectedly that high melt ratios lead to higher selectivities of $NF_3$. Therefore, another aspect of the present invention is conducting the reaction at melt ratios at or above approximately 2.55 and at $NF_3$ selectivities of at or above 50%, preferably at or above 60%, most preferably at or above 80%.

TABLE 1

Operating ranges and limits for the present invention are:

|  | Operation | Preferred |
|---|---|---|
| HF/NH$_3$ ratio | ≧~2.55 | ≧~2.65–3.0 |
| Temperature | 93–204° C. | 121–160° C. |
| Pressure | 0–400 psig | 0–50 psig |
| F$_2$ contact time | 1 sec to 5 min | 5 sec to 2 min |
| NH$_3$ flow rate | sufficient to maintain proper melt ratio | |
| F$_2$ concentration | 10–100% | 100% |
| NH$_3$ concentration | 10–100% | 80–100% |
| Power per unit volume: | | |
| stirred reactor: | ≧1000 watts/m$^3$ | ≧5000 watts/m$^3$ |
| bubble column: | ≧100 watts/m$^3$ | ≧500 watts/m$^3$ |

In the present invention, it has been found that the unexpectedly high yield of nitrogen trifluoride and high conversion of fluorine are achieved when the combination of high melt ratio and enhanced mixing or agitation of the reactants occurs. The mixing or agitation is typically achieved by a stirrer or turbine. The extent of this stirring or agitation can be expressed as power per unit volume of reactor based upon a given stirrer or turbine geometry. In the present invention in a stirred reactor, it has been found that improved results of $NF_3$ yield are achieved at or above a power of 1000 watts per cubic meter, preferably at or above 5000 watts per cubic meter, most preferably at or above 35,000 watts per cubic meter. These power values are based upon a stirrer or agitator of a flat blade turbine design and the corresponding or equivalent values for other stirrer or agitator designs or geometries can be calculated based upon the correlations found in the literature discussed below.

In this new process, enhanced mixing or agitation is a necessary requirement to achieve high $F_2$ conversion. At the state of enhanced mixing or agitation, the reactant gas, $F_2$, is well dispersed in the liquid ammonia acid fluoride (AAF). Increasing the degree of dispersion enhances the contact of the $F_2$ gas with the liquid AAF thus increasing the rate of the reaction. The degree of gas dispersion also has an effect on the amount of time that the gas remains in contact with the liquid. This is known as the residence or contact time. Usually, higher gas dispersion results in higher gas hold-up (void fraction of gas in the dispersed liquid) and hence increases the residence time of the gas in the liquid. Longer residence times allow more time for the reactants to react and results in higher conversion. Thus in the present invention of operating at a high melt ratio it is required that there be a high degree of dispersion so that both the gas-liquid mass transfer rate and the contact time are high enough to give improved yields over the prior art.

Theory and models for understanding gas-liquid mixing and their use for reactor design are well established and accepted by the engineering community. A recent article by Bakker, et. al., "How to Disperse Gases in Liquids", *Chemical Engineering*, Dec. 1994, pp 98–104, summarizes the design criteria and standard correlations for optimizing gas-liquid mixing and refers to other articles that discuss the state of the art for gas-liquid mixing in more detail. It is this article, with the commonly accepted theory and correlations, that forms the basis for the following explanation of how to quantify the enhanced mixing or agitation required in the present invention.

It is common in gas-liquid reactors to quantify the intensity of mixing or degree of gas dispersion by determining the power dissipation per unit volume of liquid. It follows then that the gas-liquid mass transfer rate and the contact time are dependent on the power-input per unit volume, $P_g/V_l$, as discussed in the following. Gas holdup, α, is defined as:

$$\alpha = (Z_g - Z_u)/Z_g \quad (7)$$

where $Z_g$ is the volume of gas-liquid mixture in the reactor during the gas dispersion process and $Z_u$ is the volume of liquid in the reactor without gas being dispersed into the liquid. The contact time, τ is calculated as:

$$\tau = V_g/Q_g \quad (8)$$

where $V_g$ is the volume of gas dispersed in the liquid and $Q_g$ is the volumetric flow rate of gas being dispersed into the liquid. Contact time is related to gas holdup through $V_g$ as follows:

$$V_g = Z_g - Z_u = \alpha Z_g \quad (9)$$

substituting for $V_g$ in Equation (8) gives, $$\tau = \alpha Z_g/Q_g \quad (10)$$

Thus increases in the contact time can be obtained by increasing the gas holdup.

For a stirred reactor the gas holdup can be increased by increasing the power-input per volume according to the following relationship:

$$\alpha = C_\alpha (P_g/V_l)^A v^B \quad (11)$$

where $P_g/V_l$ is the power-input per unit volume, v is the superficial gas velocity and $C_\alpha$, A and B are constants. Also for a stirred reactor the gas-liquid mass transfer rate is increased through an increase in the power-input per unit volume according to this correlation, where $k_L a$ is the volumetric mass transfer coefficient:

$$k_L a = C_{kLa}(P_g/V_l)^a v^b \quad (12)$$

$C_{kLa}$, a and b are different constants.

For a bubble column reactor, the power input, $P_g$, derives from the gas flowrate, as described by A. G. Jones in "Liquid Circulation In A Draft-Tube Bubble Column", *Chemical Engineering Science*, Vol. 40, No. 3, p. 449 (1985). It can be approximated by the isothermal work done by the gas bubbles expanding through the liquid, i.e., $$P_g = PvA \ln\{(P + \rho_m g H_m)/P\} \quad (13)$$

or in terms of power-input per unit volume, $$P_s/V_f = (Pv/H_m)ln\{(P+\rho_m g\, H_m)/P\} \quad (14)$$

where P is the pressure at the column head; A is the cross-sectional area of the column; $\rho_m$ is the density of the two-phase mixture of height $H_m$. In the literature, $\alpha$ and $k_L a$ are usually correlated against the superficial gas velocity, v, and not against the power-input per unit volume. However, given reactor pressure and liquid height, the power input per unit volume for a bubble column is directly proportional to the superficial gas velocity.

Thus by using the power-input per unit volume, which is easily determined, one can express the degree of mixing or agitation of reactants in either a stirred reactor or a bubble column. The power-input values found in the stirred reactor examples of this invention were calculated using the following equation from Bakker, et. al.:

$$P = N_p \rho N^3 D^5 \quad (15)$$

where $N_p$ is the impeller power number, $\rho$ is the liquid density, N is the impeller rotational speed and D is the impeller diameter. Under turbulent flow the impeller power number is a constant and its value depends upon the type of impeller as shown in Table 2 of Bakker, el. al. In the stirred reactor examples of this invention a flat blade disc turbine was used with turbulent flow and thus an impeller power number of 5.50 applies in Eq. 15. Using other impeller types will result in different power-input values from what were calculated in the examples of this invention. In particular, if a curved-blade turbine were used the power-input values would be 42% lower. Thus the absolute values for the power-input per unit volume are a function of the impeller type, with radial-flow, flat-blade and concave-blade turbine impellers the most useful and accepted type for gas-liquid agitation.

It should be re-emphasized that in a bubble column the degree of mixing, as expressed through $\alpha$ and $k_L a$, is best correlated using the gas velocity, v. Furthermore, the achievement of the proper degree of mixing or agitation in combination with high HF content for practice of this invention is not restricted to stirred or bubble column reactors. Other reactors, as found in "Chemical Reactor Development", D. Thoenes, Kluwer Academeic Publishers, Dordrecht, The Netherlands (1994) pp 98–114, that would be useful for this invention include, but are not limited to: gas-lift reactors, venturi-loop reactors, gas/liquid cyclone and centrifuge reactors, spray tower and spray cyclone reactors, falling film reactors, packed column reactors, and in-line static-mixer reactors.

The unique benefit of performing the synthesis of nitrogen trifluoride at a melt ratio greater than or equal to approximately 2.55 and with enhanced mixing or agitation expressed as power per volume of at least 1000 watts per cubic meter based upon a flat blade turbine will be illustrated by the following examples.

EXAMPLE 1

Figure 2:
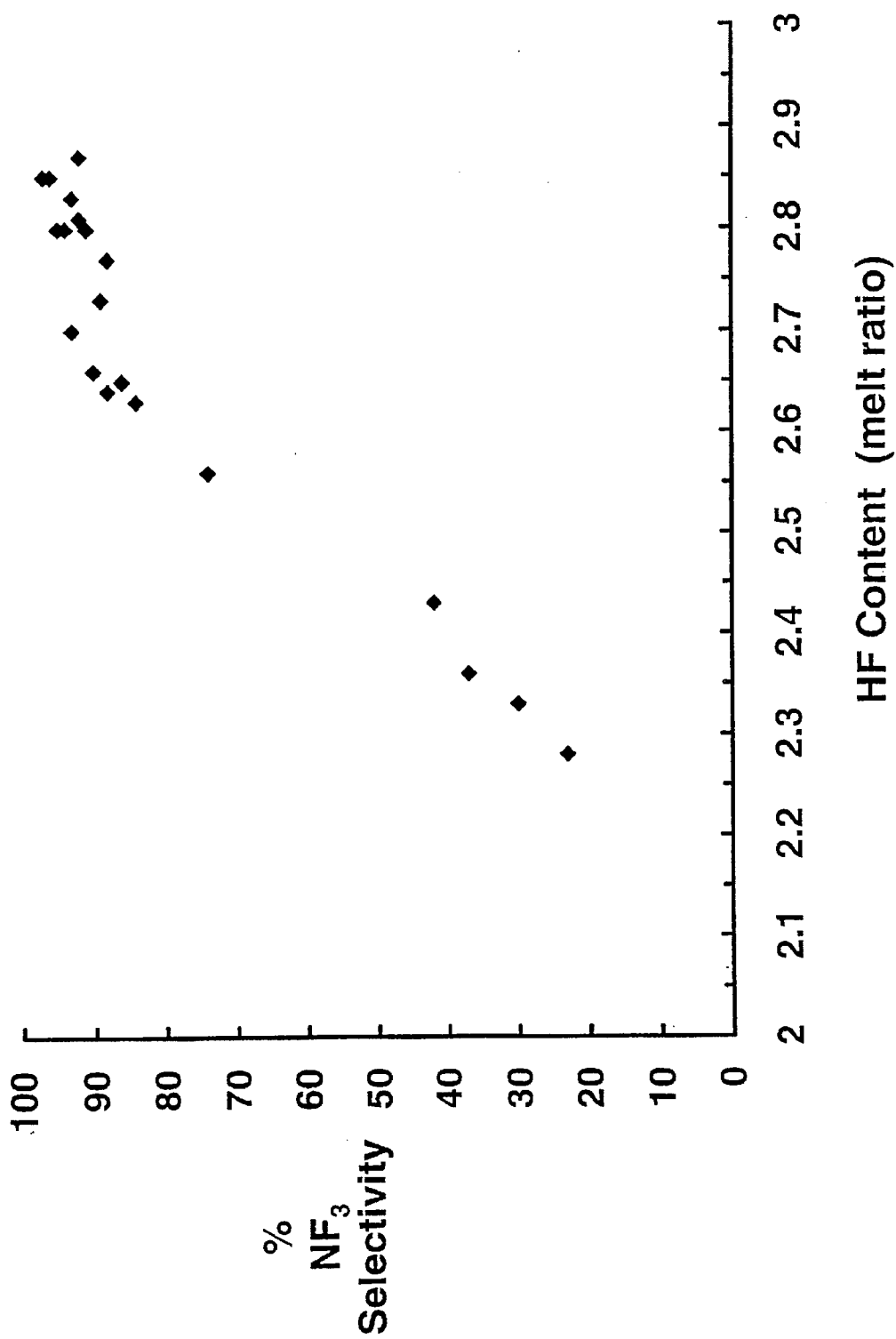
FIG. 2 is a graph of % $NF_3$ selectivity versus HF content ($HF/NH_3$ melt ratio) for the same data represented in FIG. 1 and Example 1.

Experiment showing effect of HF/NH$_3$ melt ratio (x) on NF$_3$ selectivity and yield:

A 2.0 liter Monel® reactor vessel (4" inner diameter by 12" deep) was charged with 1.6 kg of ammonium bifluoride, NH$_4$HF$_2$, and heated to 130° C. to melt the solid thus giving a liquid volume of ~1.22 liters. The reactor was fitted with a cooling coil or baffles, thermocouple probe, F$_2$ inlet tube into the liquid, NH$_3$ inlet tube, pressure gauge, pressure relief valve, exhaust port and stirrer. With a stirring speed of 1600 revolutions per minute (rpm) equivalent to 35,288 watts/cu. meter, F$_2$ was passed into the liquid at 200 standard cubic centimeters per minute (sccm) and NH$_3$ was fed at 60 sccm. The HF/NH$_3$ melt ratio was varied over the range of 2.28 to 2.85. The following exemplary results were obtained at the indicated HF/NH$_3$ melt ratio in the liquid (with additional data shown graphically in FIGS. 1 and 2 on the basis of % NF$_3$ yield and % NF$_3$ selectivity, respectively).

TABLE 2

| HF/NH$_3$ | % NF$_3$ yield | % F$_2$ conversion | % NF$_3$ selectivity |
|---|---|---|---|
| 2.28 | 23 | 99 | 23 |
| 2.46 | 42 | 99 | 42 |
| 2.56 | 73 | 99 | 74 |
| 2.80 | 90 | 95 | 95 |

The results show how increasing the melt ratio, especially above the prior art range of 2.2 to 2.5, leads to a significant increase in the NF$_3$ selectivity and yield. In other words operation at these higher melt ratios significantly enhances reaction (1) to produce NF$_3$ and minimizes the extent of reactions (2) and (3). The degree of enhancement was such that reaction (1) rountinely accounted for more than 95% of the reactions undergone by the fluorine fed into the reactor. This enhancement was not achieved by the prior art, in which reaction (1) rountinely accounted for only less than 50% of the reactions undergone by the F$_2$ fed to the reactor and reaction (2) regularly accounted for more than 50 % of the F$_2$ reacted.

The NF$_3$ yield is determined by gas chromatographic analysis and is based on the total amount of F$_2$ fed to the reactor and the conversion is based on the amount of unreacted F$_2$ measured in the exit stream from the reactor.

As mentioned, gas chromatography (GC) was used to analyze the gas-phase products to determine the F$_2$ conversion, product selectivities and yields. The GC method involved first the removal of the gaseous HF from the product stream by complexation with NaF or by liquifaction in a cold (–80° C.) trap, followed by stoichiometric conversion of any unreacted F$_2$ to 0.5 equivalents of O$_2$ by reaction with high surface area Al$_2$O$_3$:3F$_2$+Al$_2$O$_3$→1.5O$_2$+2AlF$_3$. The remaining mixture of NF$_3$, N$_2$O$_2$, N$_2$F$_2$, and N$_2$O was analyzed by standard GC methods. Using the GC data, the % yield of NF$_3$ was calculated as: [3(moles of NF$_3$ produced)/moles of F$_2$ fed]100. The % selectivity to NF$_3$ was calculated as: [3(moles of NF$_3$ produced)/moles of F$_2$ reacted]100 and the % F$_2$ conversion was calculated as: [moles of F$_2$ reacted/moles of F$_2$ fed]100. The moles of F$_2$ fed and reacted are calculated using the mole-% concentrations from the GC analysis of all the products in the reactor exhaust stream (after HF removal) along with the stoichiometric requirements of the F$_2$ reactions needed to produce these concentrations of products.

EXAMPLE 2

Figure 3:
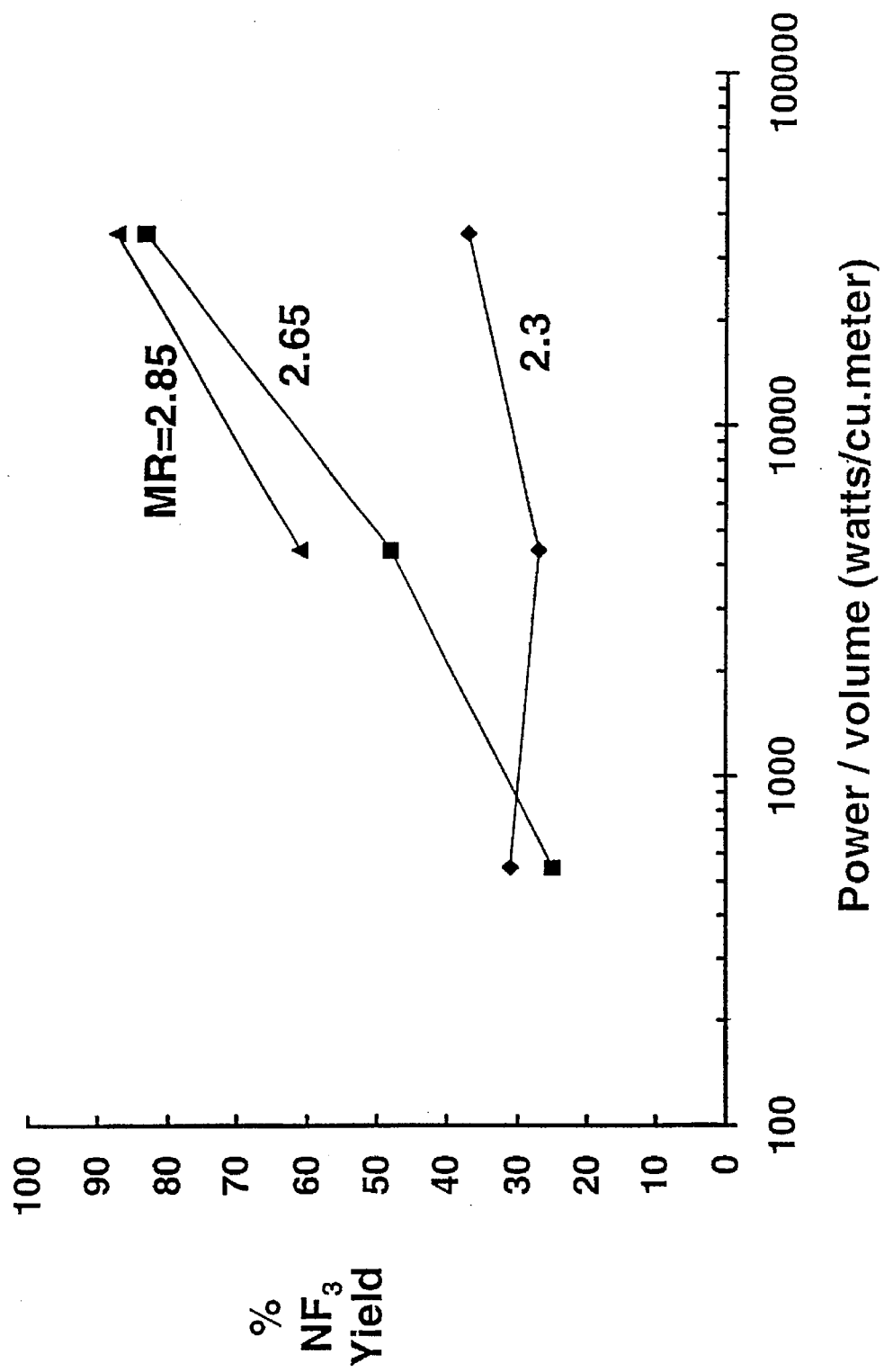
FIG. 3 is a graph of % $NF_3$ Yield versus power/volume (watts/cu. meter) for two preferred embodiments of the present invention at high melt ratio (MR=2.65, 2.85) compared to an example at low melt ratio (MR=2.3) in nitrogen trifluoride synthesis, per Example 2. Higher $NF_3$ yields at the high melt ratios of the present invention are sensitive to power/volume, while the low melt ratios typical of the prior art are insensitive to power/volume.
Figure 4:
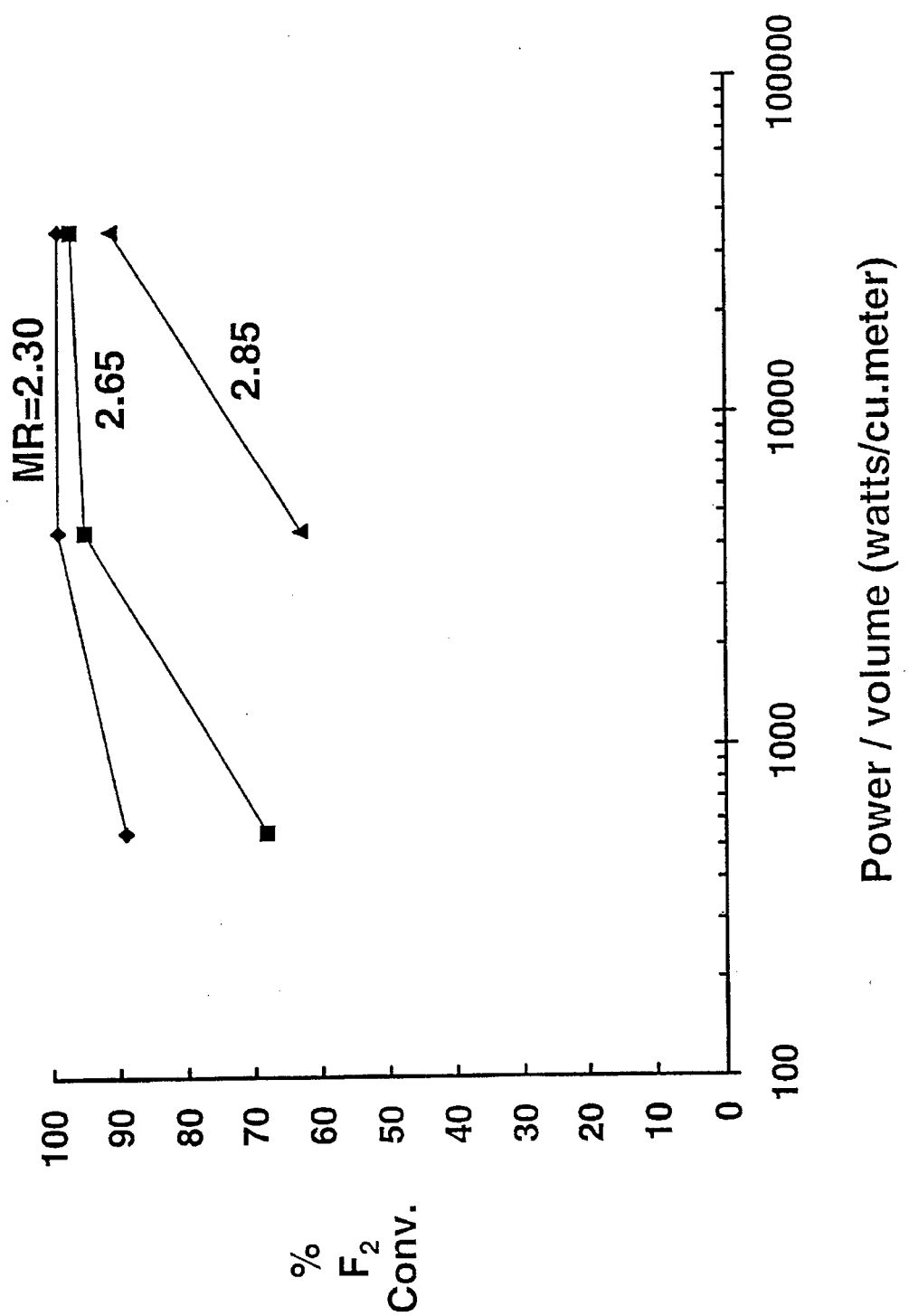
FIG. 4 is a graph of % $F_2$ Conversion versus power/volume (watts/cu. meter) for the same experimental data reported in Example 2 and FIG. 3. Again high melt ratios are more sensitive to power/volume than low melt ratios in nitrogen trifluoride synthesis.

Experiment showing effect of power/volume on NF$_3$ yield and F$_2$ conversion:

The same reactor described in the previous example was used again at 130° C. with a F$_2$ feed rate of 200 sccm. Three different HF/NH$_3$ melt ratios were used with the results shown in FIG. 3, with a power per unit volume of 551, 4,411 and 35,288 watts/cu. meter. NH$_3$ was co-fed only for the runs at 2.65 HF/NH$_3$. The results show that at higher HF/NH$_3$ melt ratios the best yields are achieved at the highest stirring speed or power per unit volume. At the HF/NH$_3$ melt ratio typical of the prior art (x=2.3) there is very little improvement of NF$_3$ yield as the stirring speed or power per unit volume is increased. The F$_2$ conversion is also dependent on stirring speed or power per unit volume as shown in FIG. 4 for the same experiments as FIG. 3. At high melt ratios the conversion decreases rapidly as the stirring speed is decreased, while at a prior art ratio of 2.3 there is little or no decrease in F$_2$ conversion as the stirring speed is lowered. The data of FIG. 3 is set forth in Table 3, below:

TABLE 3

% NF$_3$ Yields vs Power/volume

| Melt Ratio | 2.3 | 2.65 | 2.85 |
| --- | --- | --- | --- |
| 550 watts/m$^3$ | 31 | 25 | — |
| 4500 watts/m$^3$ | 27 | 48 | 61 |
| 35000 watts/m$^3$ | 37 | 83 | 87 |

The data of FIG. 4 is set forth in Table 4, below:

TABLE 4

% F$_2$ Conversion vs Power/volume

| Melt Ratio | 2.3 | 2.65 | 2.85 |
| --- | --- | --- | --- |
| 550 watts/m$^3$ | 89 | 68 | — |
| 4500 watts/m$^3$ | 99 | 95 | 63 |
| 35000 watts/m$^3$ | 99 | 97 | 91 |

EXAMPLE 3

Figure 5:
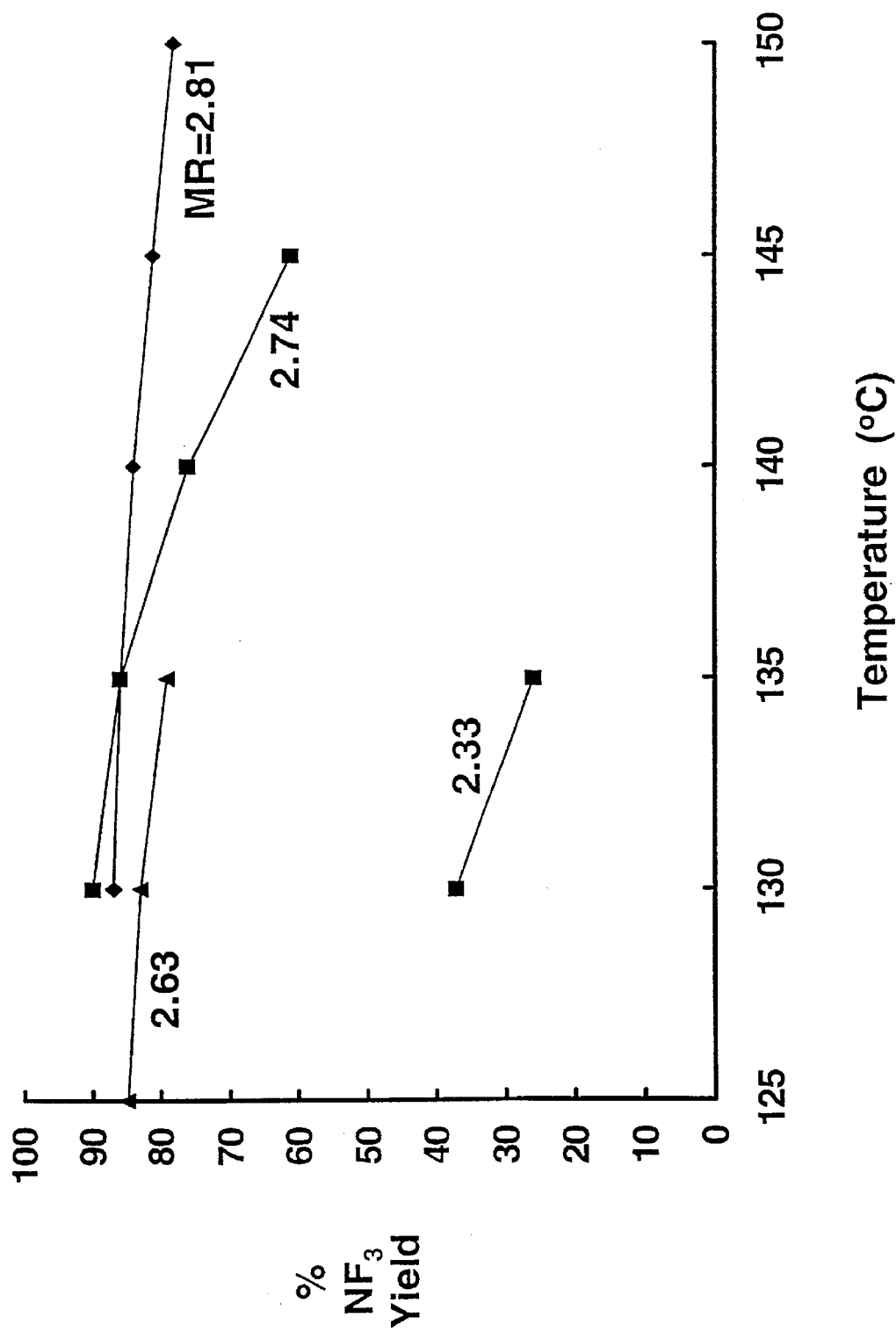
FIG. 5 is a graph of % $NF_3$ Yield versus versus Temperature (°C.) for the embodiments of Example 3 demonstrating that high melt ratios (MR) are less temperature sensitive at low temperatures than low melt ratios in nitrogen trifluoride synthesis.

Experiment showing effect of temperature on NF$_3$ yield:

The same reactor described in the previous examples was again used with the stirring speed maintained at 1600 rpm (power=35,288 watts/cu. meter) while varying the temperature from 125° C. to 150° C. As shown with the results in FIG. 5 the HF/NH$_3$ melt ratio was also varied. At the highest melt ratio of 2.81 there was only a minimal decrease in NF$_3$ yield as the temperature was increased from 130° to 150° C. At lower ratios there was a more pronounced effect of lower yields as the temperature was raised. The highest yields for each HF/NH$_3$ melt ratio were obtained at 125° to 130° C.

The high HF/NH$_3$ melt ratios maintained high NF$_3$ yield at lower temperatures in contrast to the low melt ratios representative of the prior art.

EXAMPLE 4

Experiment comparing stirred tank reactor with bubble column reactor:

A 2" diameter by 72" tall Monel® vessel was equipped with a ¼" dia. horizontal sparger tube at the bottom and an exhaust flange at the top. In order to test the prior art reactor design at the new conditions of this invention, a 1" dia. cylindrical column, 20" high was placed concentrically inside the 2" vessel over the horizontal sparger. The entire length of the inner column was packed with Monel® mesh screen wire, just as in the prior art. The results from Example 1 are tabulated here and compared to the results from the prior art described in U.S. Pat. No. 4,091,081 and to results from experiments performed in this unstirred bubble column reactor at higher HF/NH$_3$ melt ratios.

TABLE 5

| Invention Data | | | | Prior Art Data U.S. Pat. No. 4,091,081 | | | | Unstirred Bubble Column Reactor | | | |
| --- | --- | --- | --- | --- | --- | --- | --- | --- | --- | --- | --- |
| Run No. | HF/NH$_3$ Ratio | % NF$_3$ Yield | Power w/m$^3$ | Exp. No. | HF/NH$_3$ Ratio | % NF$_3$ Yield | Power w/m$^3$ | Run No. | HF/NH$_3$ Ratio | % NF$_3$ Yield | Power w/m$^3$ |
| 1 | 2.28 | 23 | 35,288 | 5 | 2.09 | 58 | 376 | 1 | 2.50 | 53 | 616 |
| 2 | 2.33 | 30 | 35,288 | 3 | 2.10 | 44 | 376 | 2 | 2.50 | 69 | 616 |
| 3 | 2.36 | 37 | 35,288 | 2d | 2.20 | 32 | 376 | 3 | 2.54 | 66 | 623 |
| 4 | 2.43 | 42 | 35,288 | 2a | 2.22 | 32 | 376 | 4 | 2.56 | 58 | 615 |
| 5 | 2.56 | 73 | 35,288 | 2b | 2.28 | 41 | 376 | 5 | 2.70 | 58 | 185 |
| 6 | 2.63 | 82 | 35,288 | 4 | 2.30 | 53 | 376 | 6 | 2.86 | 53 | 615 |
| 7 | 2.65 | 83 | 35,288 | 5 | 2.34 | 35 | 376 | | | | |
| 8 | 2.66 | 85 | 35,288 | | | | | | | | |
| 9 | 2.70 | 86 | 35,288 | | | | | | | | |
| 10 | 2.80 | 90 | 35,288 | | | | | | | | |

Figure 6:
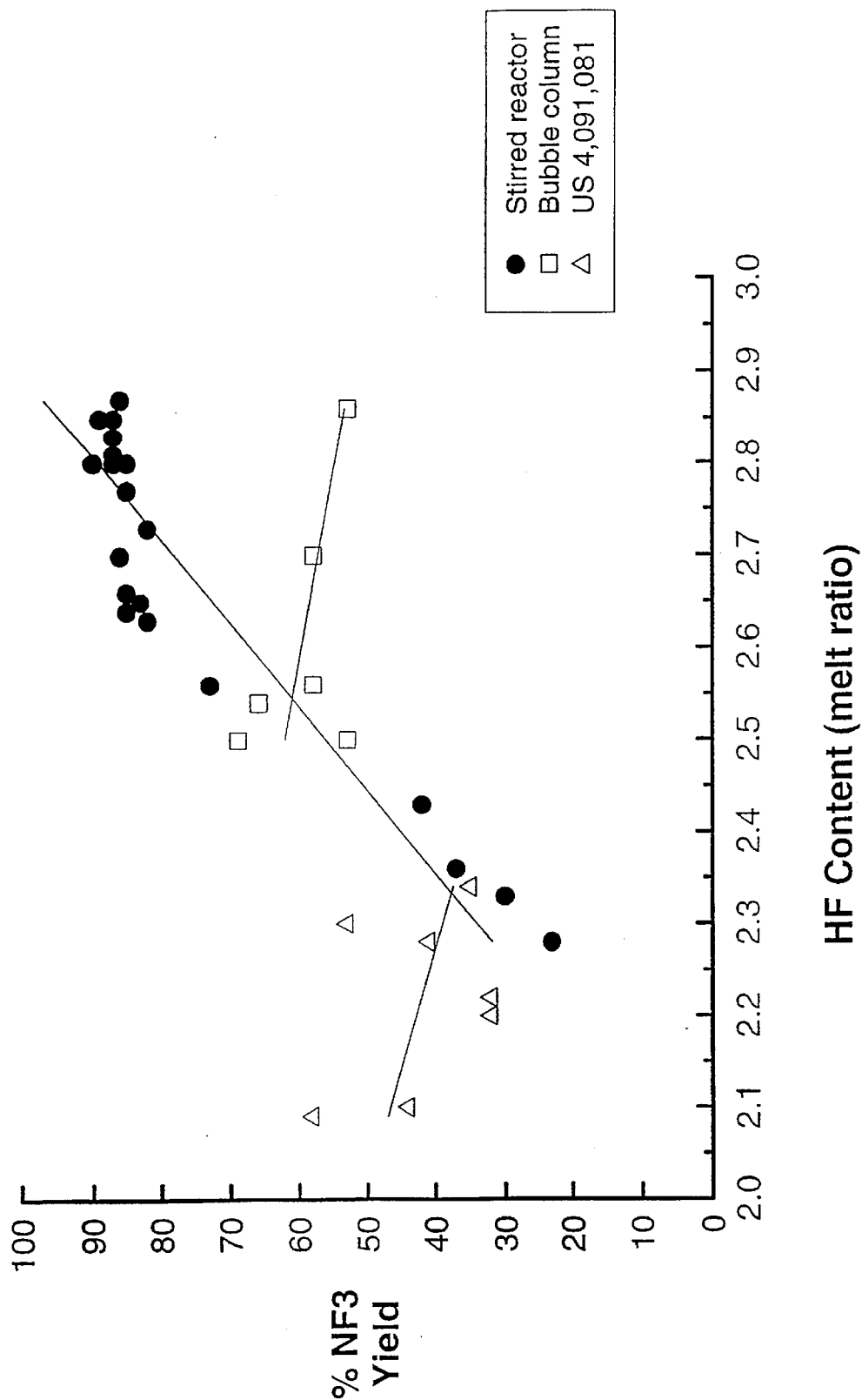
FIG. 6 is a graph of % $NF_3$ Yield versus HF content ($HF/NH_3$ melt ratio) for: (a) the stirred reactor embodiment of the present invention for nitrogen trifluoride synthesis wherein the melt ratio was varied from 2.28 to 2.85 per Example 4, below (●); (b) the prior art technique of U.S. Pat. No. 4,091,081 (△); and (c) an unstirred bubble column reactor at high melt ratio (□). The stirred reactor of the present invention, at low melt ratios, gave results similar to the prior art and the bubble column at high melt ratios. The stirred reactor at the high melt ratios of the present invention was superior to the prior art and the bubble column at high melt ratios in % $NF_3$ yield.

These results are also compared in FIG. 6. The results demonstrate that the prior art reactor does not give the exceptionally high yields obtained using the stirred reactor. Furthermore, the trends from the prior art reactor indicate that yield decreases as the HF content in the melt increases.

The unexpected improvement of higher NF$_3$ yields obtained by the present invention is a result of operating at HF/NH$_3$ ratios≥~2.55 in a stirred reactor, which had not been attempted in the prior art. The highest NF$_3$ yield reported in the prior art using gaseous fluorination of a liquid substrate was 63% (U.S. Pat. No. 4,091,081) and was from a laboratory-scale experiment. Actual commercial-scale tests have given typical yields of 40 to 50%. The present invention's laboratory work has demonstrated NF$_3$ yields of 90% and NF$_3$ selectivities of 97%. Again these improvements are attributed to a combination of two factors differing from the prior art: (1) using an HF/NH$_3$ melt ratio above the previously acceptable range of 2.2 to 2.5, which unexpectedly enhances NF$_3$ selectivity and (2) vigorous stirring or agitation of the reactants, expressed as a power per unit volume number, which enhances F$_2$ conversion and NF$_3$ selectivity. The improved yield significantly reduces the amount of HF generated, thereby reducing the quantity of waste. In the prior art process, the HF waste is converted to ammonium poly(hydrogen fluoride) by the addition of NH$_3$. This is a significant waste stream amounting to 3.5 lbs of ammonium acid fluoride waste per lb. of $NF_3$. This waste problem in the prior art process is acknowledged in USAF Propellant Handbooks, Vol. III, Part A, Nitrogen Trifluoride, Systems Design Criteria, pp7—7 to 7–10, (AFRPL-TR-77-71) January 1978. In a comparison of waste generation between the present invention process and the prior art process of U.S. Pat. No. 4,091,081 set forth in Table 6, below, it is apparent that the ammonium complex reactant, $NH_4F_xHF$, produced by the prior art process exceeds the present invention either on the basis of actual practiced data or on the basis of comparable yields using calculated data. Although the present invention produces more HF by-product than U.S. Pat. No. 4,091,081, this by-product can be readily recycled to the process for further utilization. However, the ammonium complex, $NH_4F_xHF$, is produced in significantly greater amounts by the prior art process than the present invention's process, and this waste is not recycled, but must be disposed of in some manner. This allocation of waste fluoride in the less desirable ammonium complex rather than the reuseable HF, makes the prior art process considerably less desirable than the process of the present invention. The present invention's process will generate only 1.35 lbs. of ammonium acid fluoride waste per lb of $NF_3$, a 61% reduction from U.S. Pat. No. 4,091,081. The values presented in Table 6 represent a Melt Ratio of 2.8 for the present invention and a Melt Ratio of 2.3 for the U.S. Pat. No. 4,091.081.

4. The method of claim 1 wherein x is greater than or equal to approximately 2.65.

5. The method of claim 1 wherein x is greater than or equal to approximately 2.85.

6. A method for synthesis of $NF_3$ by the reaction of a fluorine reactant and an ammonium complex reactant selected from the group consisting of $NH_4H_{(x-1)}F_x$, $(NH_4)_yMF_z \cdot nHF$ and mixtures thereof where x is equal to or greater than 2.55, y is 1–4, z is 2–8, n is sufficient at reaction conditions to maintain said ammonium complex reactant substantially as a liquid and M is selected from the group consisting of elements from Group IA through VA, Group IB through VIIB and Group VIII of the Periodic Table of the Elements, and said reactants are mixed at a rate to maintain a percent $NF_3$ selectivity of greater than or equal to 50 percent.

7. The method of claim 3 wherein x is greater than or equal to approximately 2.65.

8. The method of claim 3 wherein x is greater than or equal to approximately 2.85.

9. The method of claim 3 wherein said percent $NF_3$ selectivity is greater than or equal to 60 percent.

10. The method of claim 3 wherein said percent $NF_3$ selectivity is greater than or equal to 80 percent.

11. A method for synthesis of $NF_3$ by the reaction of a fluorine reactant and an ammonium complex reactant of $NH_4H_{(x-1)}F_x$, where x is equal to or greater than 2.55, and

TABLE 6

| | Waste F⁻ - NF₃ Processes | | | | |
|---|---|---|---|---|---|
| | lb. $NH_4F \times HF$ per lb $NF_3$ | % HF as vapor in crude $NF_3$ stream | lb waste F⁻ as HF vapor | lb waste F⁻ as $NH_4F \times HF$ | % waste F⁻ recoverable as HF |
| (1)U.S. Pat. No. 4,091,081 @ 40% Yield - 100% Conv. | 3.5 | 10 | 0.5 | 2.7 | 15 |
| (1)Present Invention @ 80% Yield - 100% Conv. | 1.35 | 40 | 0.22 | 0.98 | 18 |
| U.S. Pat. No. 4,091,081 @ 63% Yield - 100% Conv. | 2.44 | 10 | 0.05 | 1.69 | 2.9 |
| (2)Present Invention @ 63% Yield - 100% Conv. | 2.12 | 32 | 0.20 | 1.54 | 11.5 |
| (2)Present Invention @ 63% Yield - 80% Conv. 79% Selectivity | 1.47 | 32 | 0.264 | 1.074 | 15 |

(1)Actual Collected Values
(2)Calculated

The present invention has been set forth with regard to several preferred embodiments, however the full scope of the present invention should be ascertained from the claims which follow.

We claim:

1. A method for synthesis of $NF_3$ by the reaction of a fluorine reactant and an $NH_4H_{(x-1)}F_x$ reactant, where x is equal to or greater than 2.55, and said reactants are mixed using a mixing means at a mixing level achieved by input of power to said mixing means of greater than or equal to 1000 watts per cubic meter on the basis of a flat blade turbine.

2. The method of claim 1 wherein said power is greater than or equal to 5000 watts per cubic meter.

3. The method of claim 1 wherein said power is greater than or equal to 35,000 watts per cubic meter.

said reactants are mixed at a rate to maintain a percent $NF_3$ yield of at least 65 percent.

12. A method for synthesis of $NF_3$ by the reaction of a fluorine reactant and an ammonium complex reactant selected from the group consisting of $NH_4H_{(x-1)}F_x$, $(NH_4)_yMF_z \cdot nHF$ and mixtures thereof where x is equal to or greater than 2.55, y is 1–4, z is 2–8, n is sufficient at reaction conditions to maintain said ammonium complex reactant substantially as a liquid and M is selected from the group consisting of elements from Group IA through VA, Group IB through VIIB and Group VIII of the Periodic Table of the Elements and mixtures thereof, and said reactants are mixed at a rate to maintain a percent $NF_3$ yield of at least 65 percent.

13. The method of claim 1 wherein said reactants are mixed at a rate to maintain a percent $NF_3$ yield of at least 80 percent.

14. The method of claim 1 wherein said reactants are mixed at a rate to maintain a percent $NF_3$ yield of at least 90 percent.

15. The method of claim 1 wherein said reaction is conducted in a stirred reactor.

16. The method of claim 1 wherein said reaction is conducted in a bubble column reactor.

17. The method of claim 1 wherein said reaction is performed in a continuous manner with fluorine and an ammonia source continuously added to said reaction.

18. The method of claim 17 wherein said ammonia source is selected from the group consisting of $NH_3$, $NH_4F$, $NH_4HF_2$, $NH_4Cl$, $NH_4Br$, $NH_4I$, $NH_4NO_3$, $(NH_4)_2SO_4$ and $(NH_4)_2CO_3$ and mixtures thereof.

19. The method of claim 1 wherein x is greater than or equal to approximately 2.65.

20. The method of claim 1 wherein x is greater than or equal to approximately 2.85.

21. The method of claim 1 wherein the temperature of said reaction is in the range of 93° C. to 204° C.

22. The method of claim 18 wherein the temperature of said reaction is in the range of 121° C. to 160° C.

23. The method of claim 1 wherein the pressure of the reaction is maintained in the range of 0 to 400 psig.

24. The method of claim 20 wherein the pressure of the reaction is maintained in the range of 0 to 50 psig.

* * * * *